United States Patent
Smith et al.

(10) Patent No.: US 7,650,599 B2
(45) Date of Patent: Jan. 19, 2010

(54) METHOD AND SYSTEM FOR ACCEPTING PRECOMPILED INFORMATION

(75) Inventors: Michael D. Smith, Kirkland, WA (US); Oshoma Momoh, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 909 days.

(21) Appl. No.: 11/173,186

(22) Filed: Jun. 30, 2005

(65) Prior Publication Data

US 2006/0026573 A1 Feb. 2, 2006

Related U.S. Application Data

(63) Continuation of application No. 09/547,539, filed on Apr. 12, 2000, now abandoned.

(51) Int. Cl.
*G06F 9/45* (2006.01)
(52) U.S. Cl. ...................................... 717/146
(58) Field of Classification Search ................. 717/104, 717/118, 126, 147, 146; 707/9; 709/223, 709/224; 713/181
See application file for complete search history.

(56) References Cited

U.S. PATENT DOCUMENTS

| | | | |
|---|---|---|---|
| 5,313,635 A | | 5/1994 | Ishizuka et al. |
| 5,649,099 A | | 7/1997 | Theimer et al. |
| 5,774,729 A | * | 6/1998 | Carney et al. ............... 717/126 |
| 5,881,289 A | | 3/1999 | Duggan et al. |
| 5,937,192 A | * | 8/1999 | Martin ........................ 717/145 |
| 5,940,590 A | | 8/1999 | Lynne et al. |
| 6,029,000 A | * | 2/2000 | Woolsey et al. ............. 717/147 |
| 6,058,482 A | | 5/2000 | Liu |
| 6,167,253 A | | 12/2000 | Farris et al. |
| 6,199,195 B1 | * | 3/2001 | Goodwin et al. ............ 717/104 |
| 6,223,291 B1 | | 4/2001 | Puhl et al. |
| 6,295,645 B1 | | 9/2001 | Brewer |
| 6,324,685 B1 | * | 11/2001 | Balassanian ................. 717/118 |
| 6,370,687 B1 | | 4/2002 | Shimura |
| 6,393,420 B1 | | 5/2002 | Peters |
| 6,473,777 B1 | * | 10/2002 | Hendler et al. .............. 707/206 |
| 6,477,648 B1 | | 11/2002 | Schell et al. |
| 6,539,480 B1 | | 3/2003 | Drews |
| 6,560,774 B1 | | 5/2003 | Gordon et al. |
| 6,574,627 B1 | * | 6/2003 | Bergadano et al. ............ 707/9 |
| 6,804,780 B1 | * | 10/2004 | Touboul ...................... 713/181 |

FOREIGN PATENT DOCUMENTS

| EP | 0 778 522 A2 | 6/1997 |
|---|---|---|
| EP | 0 930 567 A2 | 7/1999 |

OTHER PUBLICATIONS

Plezbert, M. et al., "Does 'Just in Time'='Better Late than Never'?", *POPL 97, Paris, France*, pp. 120-131 (1997).
Sfrer, E. et al., "Design and Implementation of a Distributed Virtual Machine for Networked Computers", *SOSP-17*, pp. 202-216 (1999).
U.S. Appl. No. 09/548,056, filed Apr. 12, 2000.

* cited by examiner

*Primary Examiner*—Tuan Anh Vu
(74) *Attorney, Agent, or Firm*—Merchant & Gould P.C.

(57) ABSTRACT

A method of offloading compilation includes transmitting compilation information from a first subsystem to a second subsystem. The method also includes compiling computer program code into machine-executable code on the second subsystem based on the compilation information received from the first subsystem. The method further includes receiving the machine-executable code from the second subsystem into the first subsystem.

12 Claims, 4 Drawing Sheets

METHOD AND SYSTEM FOR ACCEPTING PRECOMPILED INFORMATION

RELATED APPLICATION

This is a continuation of application Ser. No. 09/547,539, filed on Apr. 12, 2000 and entitled "Method and System for Accepting Precompiled Information," the entirety of which is hereby incorporated by reference.

TECHNICAL FIELD

The present invention relates to distributed computing environments and more particularly to sharing processes in distributed computing environments.

BACKGROUND

Typically, computing systems include a processor and a memory system. In some computing systems, the processor and memory system is relatively small and thus limits the capacity of the computing system to perform large computer processes, such as executing large computer programs or compiling a computer program. These computing systems are primarily intended to execute limited programs associated with their functionality. For example, a cellular phone executes a computer program associated with transmitting and receiving telephone calls and managing associated data, i.e. names and telephone numbers.

Some processes on computing systems are processor and memory intensive, often exceeding the capacity of the computing system or taking a considerable amount of time to complete the process. Therefore, improvements are desirable.

SUMMARY

The compilation process is processor and memory intensive. This process consumes valuable resources of the computing subsystem, especially for small devices. Small computing devices, such as a cellular telephone, might not have the processor, memory capacity, or power capacity to compile code. Therefore, the present invention contemplates methods and systems for offloading the compilation process.

In one aspect of the present invention, a method of offloading compilation is provided. The method includes transmitting compilation information from a first subsystem to a second subsystem. The method also includes compiling computer program code into machine-executable code on the second subsystem based on the compilation information received from the first subsystem. The method further includes receiving the machine-executable code from the second subsystem into the first subsystem.

In another aspect, a computer program storage medium readable by a computing system and encoding a computer program of instructions for offloading compilation is provided. The computer process is analogous to the method described above.

Another aspect of the present invention includes a system for offloading compilation. The system includes a transmit module, a compile module, and a receive module. The transmit module transmits compilation information from a first subsystem to a second subsystem. The compile module compiles program code into machine-executable code on the second subsystem based on the compilation information received from the first subsystem. The receive module receives the machine-executable code from the second subsystem into the first subsystem.

In another aspect, a computer data signal embodied in a carrier wave readable by a computing system and encoding a computer program of instructions for offloading compilation is provided. The computer process is analogous to the method described above.

A more complete appreciation of the present invention and its scope may be obtained from the accompanying diagrams, that are briefly described below, from the following detailed descriptions of presently preferred embodiments of the invention and from the appended claims.

DETAILED DESCRIPTION

In the following description of preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

In general, the present disclosure describes methods and systems for accepting precompiled information from other systems, or in other words, offloading compilation from one subsystem to another subsystem.

Typically, computing systems execute a sequence of logical operations, commonly referred to as a computer program initially written in source language code. The source code could be any number of common computer programming languages, such as Fortran, C++, Pascal, Java, and the like. Each language has its own advantages and disadvantages; therefore, the particular source code language is a matter of choice.

The computing system is able to execute the sequence of logical operations from a machine-readable, or machine-executable, code compiled from the source code. By the term "machine-readable," it is meant that the code is in a format with which the computing system can identify and execute the sequence of instructions. There are a large variety of machine-readable formats. The machine-readable format required by any particular computing system, in order to execute, is dependent on the particular computing system that will execute the code. Code that is executable on one particular computing system might not be executable on another computing system.

Because each computing system requires its own particular machine-readable format and because there are many source language codes, the source language codes are typically translated by a source-code compiler into an intermediate language (IL), typically implemented by and accepted by a large variety of systems.

Typically, the IL code is distributed to any number of receiving systems. Again, because each computing system requires its own particular machine-readable format, the IL code is translated by a machine-executable compiler. The machine-executable compiler translates the IL code into a format readable by the particular system desiring to execute the code.

In this fashion, each source code programmer needs to only have the particular source-code compiler for the particular source code desired to be translated into the IL code, rather than many source-code compilers for each type of machine-executable code. Likewise, each computing subsystem needs to only have the machine-executable compiler associated with the particular computing subsystem, rather than many machine-executable compilers for each type of source code.

It is noted that the machine-executable compiler does not necessarily compile the entire IL code into a machine-executable code prior to execution of the program. The machine-executable compiler might only compile the IL code as it is needed. For example, as the IL code is executed, the machine-executable compiler compiles the IL code into the machine-executable code. The machine-executable compiler compiles only the IL code portion being executed. Any unexecuted portions, such as subroutines, remain in IL format. This process has advantages and disadvantages. For example, this process saves overall compilation time, because the entire IL code is not compiled, but slows done execution of the program, because the compilation occurs during execution. This process also saves secondary storage space on the computing device, because the secondary device does not need to store the entire machine-executable code. In general, there is a trade-off between the quality of the compiled code produced and the amount of time taken for the compilation. Thus, higher quality, or optimized, code results in longer compilation times and more memory resources required.

Figure 1:
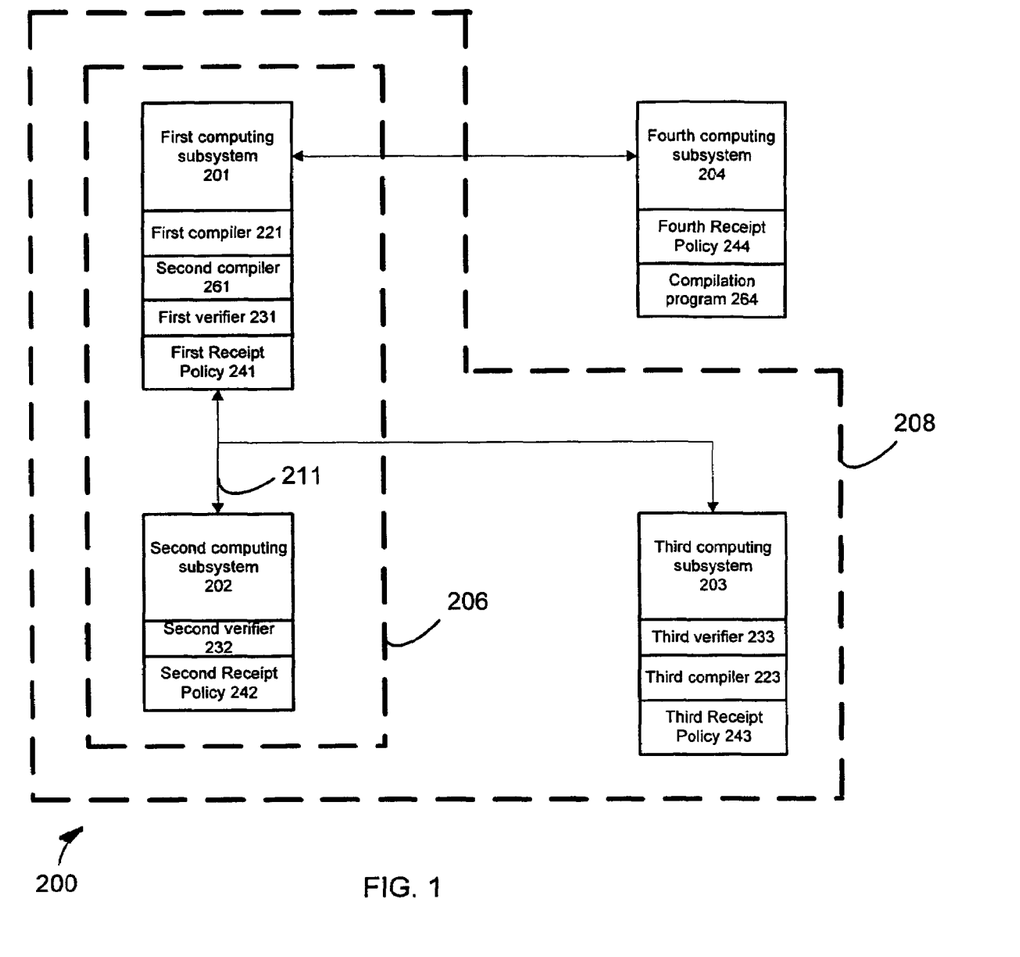
FIG. 1 is a schematic representation of a distributed computing environment that may be used to implement aspects of the present invention.

Referring now to FIG. 1, a distributed computing environment 200 might include a number of computing subsystems. In the particular embodiment illustrated in FIG. 1, the distributed computing environment 200 includes a first computing subsystem 201, a second computing subsystem 202, a third computing subsystem 203, and a fourth computing subsystem 204. Of course, any combination or any part of the subsystems 201-204 might be components of a single subsystem. Each computing subsystem 201-204 might be one of a variety of computing systems. Computing systems of this sort can include a server, a router, a network personal computer, a peer device, a hand-held device, a small device, and the like, or other common network nodes, each typically including many or all of the elements described herein in connection with the computing system 100 of FIG. 2, described hereinafter.

The distributed computing environment 200 might be one of a variety of distributed computing environments, for example, a local area network (LAN) 206 or a wide are network (WAN) 208. In such an environment the computing systems 201-204 are linked to each other using logical connections 211. Such computing environments are commonplace in offices, enterprise-wide computer networks, Intranets, and the Internet.

In the embodiment illustrated in FIG. 1, the first computing subsystem 201 and the second computing subsystem 202 are part of a LAN, while the first, second, and third computing subsystems 201-203 are part of a WAN. The fourth computing subsystem 204 might be a small device, occasionally connected to the first computing subsystem 201.

Referring to FIG. 1, the first computing subsystem 201 includes a first compiler 221, capable of translating IL code into the machine-executable code readable by the first computing subsystem 201 and a second compiler 261, capable of translating Il code into machine-executable code readable by the fourth computing subsystem 204, as will be explained in more detail below. In one exemplary embodiment, the first and second compilers 221, 261 are one compiler that uses compilation information to compile code for different computing devices. In another embodiment, the third computing subsystem 203 includes a third compiler 223, capable of translating the IL code into the machine-executable code readable by the third computing subsystem 203.

It is noted that the fourth computing subsystem 204 does not include a compiler. The fourth computing subsystem 204 might be a small device, such as a cellular telephone, having limited processor and memory capacity. Preferably, the fourth computing subsystem 204 includes a compilation program 264, typically written in IL code. The compilation program 264 contains compilation instructions, or compilation information, for compiling, on another computing subsystem, i.e. the first computing subsystem 201, an IL code into machine-executable code for the fourth computing subsystem 204. The compilation program 264 might be written in IL code, of a higher level of source language.

In general, the fourth computing subsystem 204 uses a compiler from another subsystem having more processing and memory capacity, such as the second compiler 261 of the first computing subsystem 201, to offload compilation of IL code into machine-executable code for the fourth computing subsystem 204. The second compiler 261 uses the compilation program 264 from the fourth computing subsystem 204, as will be explained in more detail below. By the term "offloading compilation," it is meant a subsystem, such as the fourth computing subsystem 204, has another subsystem, such as the first computing subsystem 201, compile code into machine-executable code for it. The first subsystem 201 that performs the compilation is thus doing so either in parallel with network communication of the code, offsetting the performance/code compilation time tradeoff, or in isolation of the code's execution. This allows the first subsystem 201, having greater resources, to compile more optimal code for the fourth subsystem 204. In some instances, the first subsystem 201 might already have compiled the code. In such instances, the fourth subsystem 204 provides identification to the first subsystem 201 regarding the code the fourth subsystem 204 desires. The first subsystem 201 can transmit the compiled code to the fourth subsystem 204 without recompiling it.

Preferably, the fourth computing subsystem 204 also includes a receipt policy 244. The receipt policy 244 is a policy determined by the host computing subsystem, in this example, the fourth computing subsystem 204, by an administrator of the host computing subsystem, or by another subsystem, about which machine-executable code it will accept. Typically, the receipt policy 244 is based on the source of the receipt of the information or a trusted source. By the term "trusted source," it is meant the host fourth computing subsystem 204 has knowledge that machine-executable code received by the fourth computing subsystem 204, for example, code received from the first computing subsystem 201, will not compromise the integrity of the fourth computing subsystem 204. This knowledge may be based on a trusted relationship between the computing subsystems, i.e. the first and fourth computing subsystems 201, 204.

For example, the transmitting and receiving computing subsystems may be connected via a secure link. Therefore, the receiving fourth computing subsystem 204 knows that the machine-executable code could not have been tampered with when received from the first computing subsystem 201. An exemplary policy might be that the receiving computing subsystem will accept machine-executable code from any subsystem with which it is securely linked.

Figure 2:
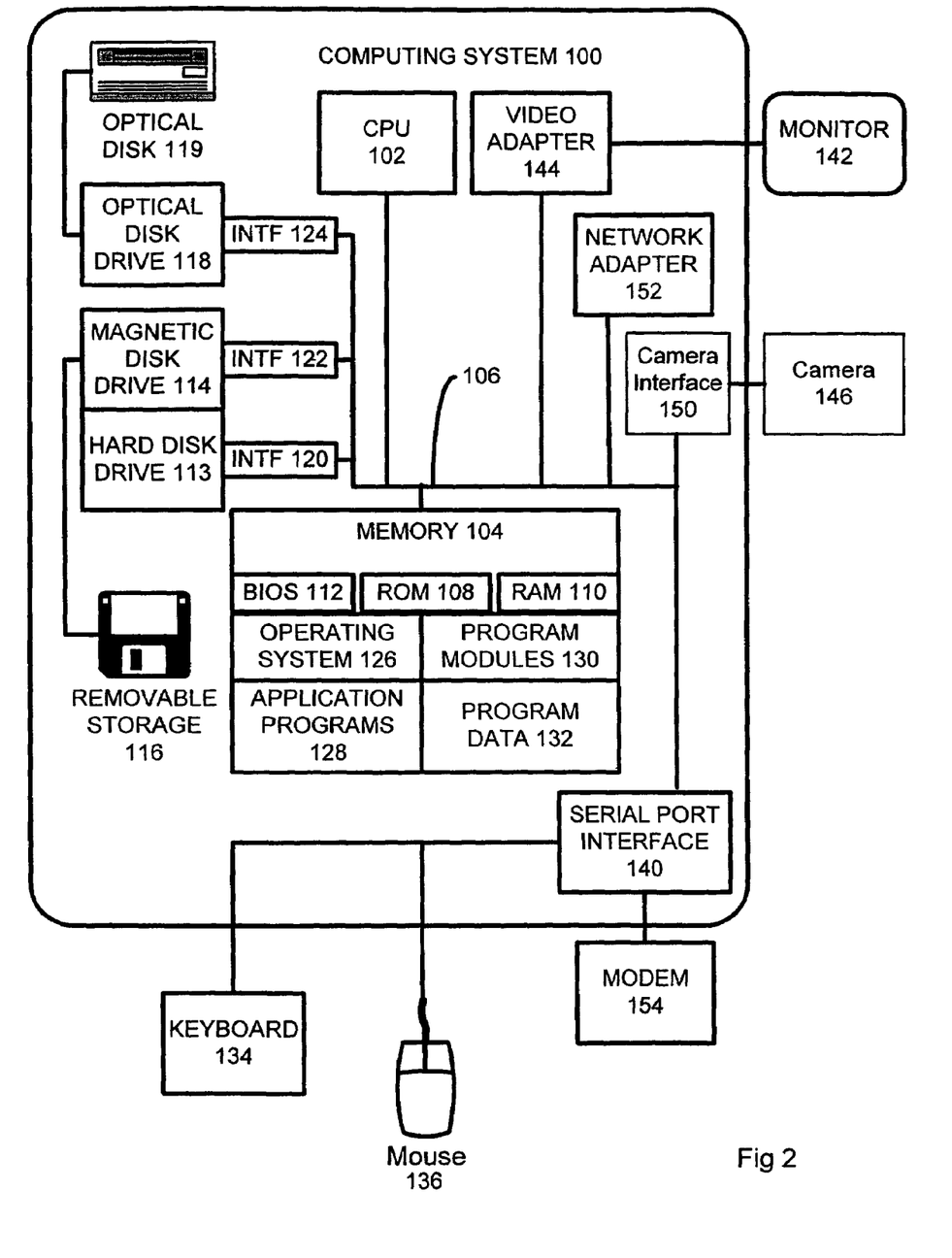
FIG. 2 is a schematic representation of a computing system that may be used to implement aspects of the present invention.

Referring now to FIG. 2, an exemplary environment for implementing embodiments of the invention includes a general purpose computing device in the form of a computing system 100, such as a personal computer, includes at least one processing unit 102. A variety of processing units are available from a variety of manufacturers, for example, Intel or Advanced Micro Devices. The computing system 100 also includes a system memory 104, and a system bus 106 that couples various system components including the system memory 104 to the processing unit 102. The system bus 106 might be any of several types of bus structures including a memory bus, or memory controller; a peripheral bus; and a local bus using any of a variety of bus architectures.

Preferably, the system memory 104 includes read only memory (ROM) 108 and random access memory (RAM) 110. A basic input/output system 112 (BIOS), containing the basic routines that help transfer information between elements within the computing system 100, such as during startup, is typically stored in the ROM 108.

Preferably, the computing system 100 further includes a secondary storage device 113, such as a hard disk drive, for reading from and writing to a hard disk (not shown), a magnetic disk drive 114 for reading from or writing to a removable magnetic disk 116, and an optical disk drive 118 for reading from or writing to a removable optical disk 119, such as a compact disk (CD) ROM, digital video disk (DVD) ROM, or other optical media.

The hard disk drive 113, magnetic disk drive 114, and optical disk drive 118 are connected to the system bus 106 by a hard disk drive interface 120, a magnetic disk drive interface 122, and an optical drive interface 124, respectively. The drives and their associated computer-readable media provide nonvolatile storage of computer readable instructions, data structures, program modules and other data for the computing system 100.

Although the exemplary environment described herein employs a hard disk, a removable magnetic disk 116, and a removable optical disk 119, it should be appreciated by those skilled in the art that other types of computer-readable media, capable of storing data, can be used in the exemplary system. Examples of these other types of computer-readable mediums include magnetic cassettes, flash memory cards, digital video disks, Bernoulli cartridges, CD ROMs, DVD ROMs, random access memories (RAMs), read only memories (ROMs), and the like.

A number of program modules may be stored on the hard disk, magnetic disk 116, removable optical disk 119, ROM 108, or RAM 110, including an operating system 126, one or more application programs 128, other program modules 130, and program data 132. A user may enter commands and information into the computing system 100 through input devices, such as a keyboard 134 and a pointing device 136, such as a mouse. Examples of other input devices might include a microphone, joystick, game pad, satellite dish, scanner, and a telephone. These and other input devices are often connected to the processing unit 102 through a serial port interface 140 that is coupled to the system bus 106. Nevertheless, these input devices also might be connected by other interfaces, such as a parallel port, game port, or a universal serial bus (USB). A display device 142, such as a monitor, is also connected to the system bus 106 via an interface, such as a video adapter 144. In addition to the display device 142, computing systems, in general, typically include other peripheral devices (not shown), such as speakers, printers, and palm devices.

The computing system 100 might also include a camera 146, such as a digital/electronic still or video camera, or film/photographic scanner, capable of capturing a sequence of images. The images are input into the computing system 100 via an appropriate camera interface 150. This camera interface 150 is connected to the system bus 106, thereby allowing the images to be routed to and stored in the RAM 110, or one of the other data storage devices associated with the computing system 100. However, it is noted that image data can be input into the computing system 100 from any of the aforementioned computer-readable media as well, without requiring the use of the camera 146.

When used in a LAN networking environment 206, FIG. 1, the computing system 100 of FIG. 2 is connected to the local network 206 through a network interface or adapter 152. When used in a WAN networking environment 208, such as the Internet, the computing system 100 typically includes a modem 154 or other means, such as a direct connection, for establishing communications over the wide area network 208. The modem 154, which can be internal or external, is connected to the system bus 106 via the serial port interface 140. In a networked environment, program modules depicted relative to the computing system 100, or portions thereof, may be stored in a remote memory storage device. It will be appreciated that the network connections shown are exemplary and other means of establishing a communications link between the computing systems may be used.

Of course in alternate embodiments, a computing device may include any suitable computing architecture, including hand-held computers, palm computers, and small devices, such as cellular telephones.

Figure 3:
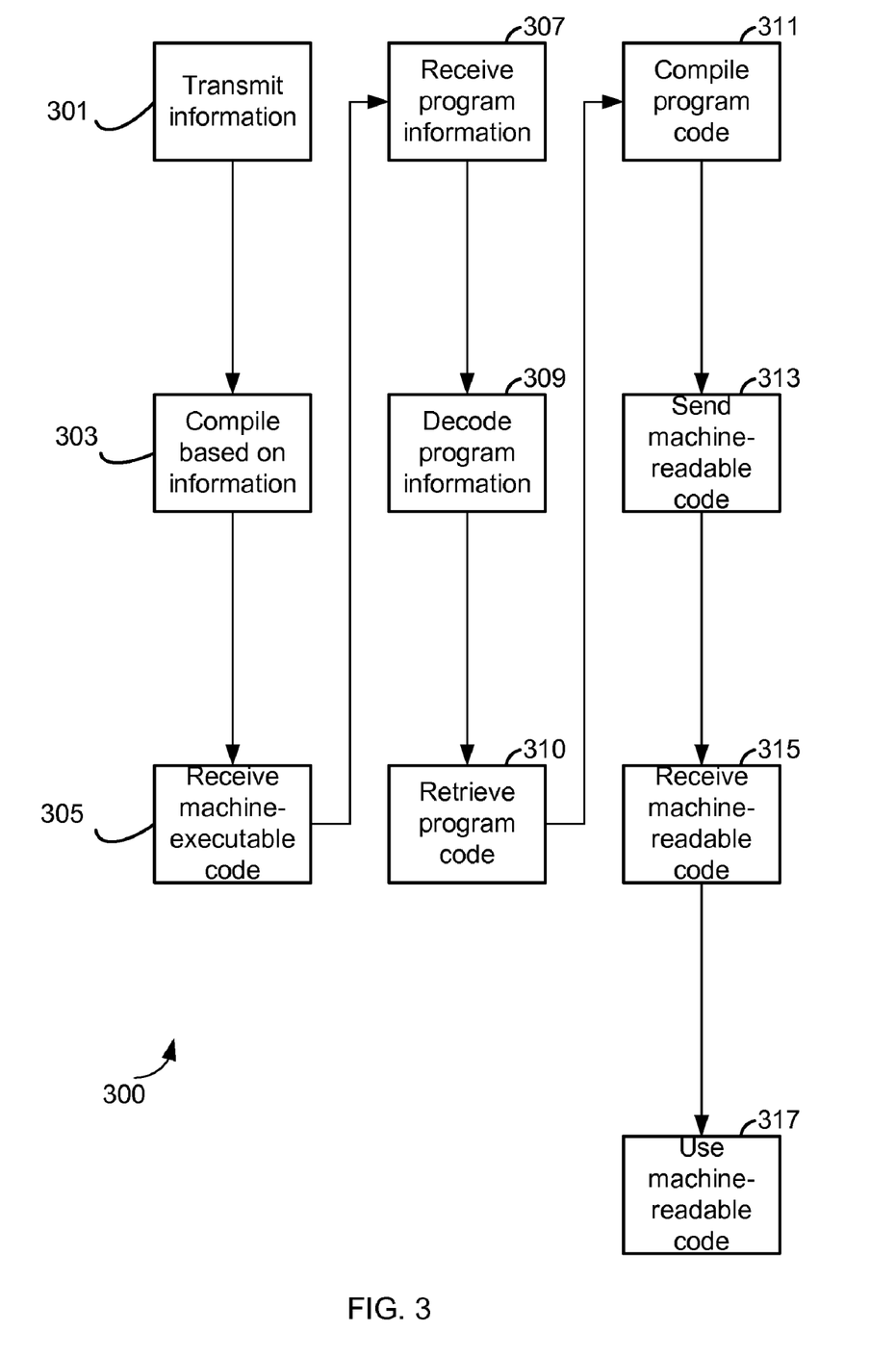
FIG. 3 is a schematic representation of methods and systems for offloading compilation, according to an embodiment of the present invention.

Referring now to FIG. 3, an offloading system 300 for offloading compilation from a first subsystem to a second subsystem is shown. A receive module 301 in the first subsystem receives a call for a program A machine-readable code from the second subsystem. A retrieve operation 303 retrieves program A information, i.e. compilation information from the second subsystem. A transmit module 305 transmits the program A information from the first subsystem to the second subsystem.

A receipt module 307 receives the program A information in the second subsystem. A decode operation 309 decodes the program A information. A retrieve step 310 retrieves program A code for compilation into program A machine-readable code. It is noted that prior to compilation, the program A code might be in IL code or source code and might reside in the first subsystem, the second subsystem, or a third subsystem. Operation 311 in the second subsystem compiles the program A into machine-readable code based on the program A information received from the first subsystem. A send module 313 sends the program A machine-readable code to the first subsystem. A receive step 315 receives the program A machine-readable code. A use module 317 uses the program A machine-readable code by, for example, storing the program A machine-readable code or executing the program A machine-readable code.

In an alternative embodiment, a first subsystem might send a compiled program to the second subsystem without a request form the second subsystem, for the second subsystem's use. In another alternative embodiment, a first subsystem might include a program to be compiled and sends both the compilation information and the program to be compiled to a second computing subsystem. The second computing subsystem then returns the compiled program to the first subsystem.

Figure 4:
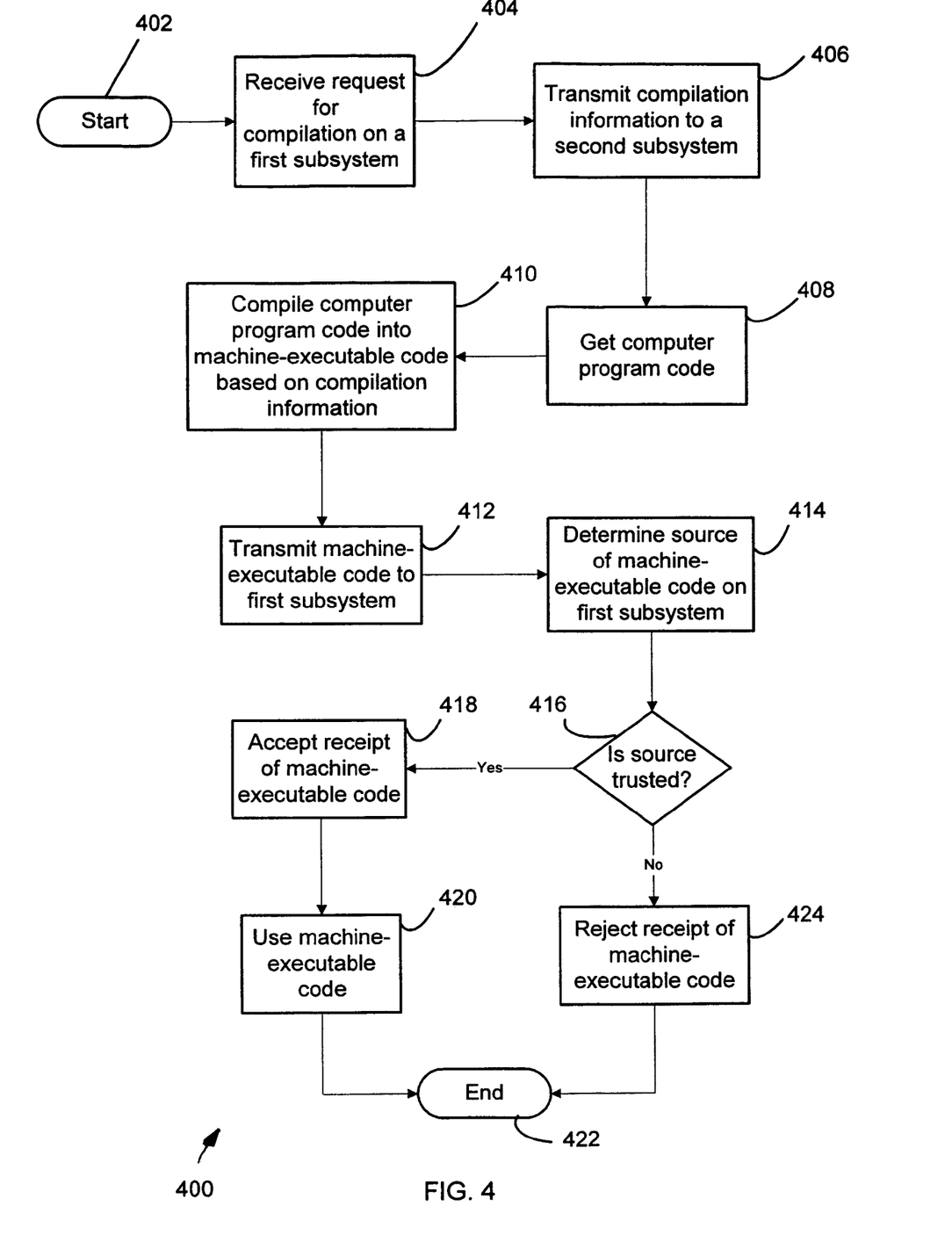
FIG. 4 is a flow chart illustrating the logical operations of the methods and systems of FIG. 3.

FIG. 4 is a flow chart representing logical operations of an offloading system 400 for offloading compilation of code into machine-executable code, according to another embodiment. Entrance to the operational flow of the acceptance system 400 begins at a flow connection 402. A request module in 404 subsystem receives a request for compilation on a first subsystem. The request may be generated by the first subsystem in response to a prompting, for example a request to execute a program on the first subsystem. A transmit operation 406 transmits compilation information from the first subsystem to a second subsystem. The compilation information contains information about the first subsystem and its requirements for the format of the machine-executable code. This information might also include the size of the memory or secondary storage space of the first subsystem. Preferably, the compilation code is written in IL code. In an alternative embodiment, the compilation information might be written in source code. In another alternative embodiment, the compilation information might be data.

A get operation 408 obtains the computer program code that needs compilation by the second subsystem. Preferably, the get operation 408 obtains IL code for compilation into machine-readable code. It is noted that the get operation 408 could obtain source code for compilation into machine-readable code or into IL code, depending on the application.

In one example embodiment, the computer program code is transmitted by the first subsystem to the second subsystem along with the compilation information. In a second example embodiment, the computer program code is received by the second subsystem from a third source. In a third example embodiment, the computer program code is contained within the second subsystem for retrieval by the second subsystem.

A compile module 410 compiles the computer program code received from the get operation 408 into machine executable code for use on the first subsystem. Preferably, the compile module 410 decodes information contained within the compilation information to compile the code for the first subsystem's use. In one example embodiment, the second subsystem compiles code for multiple other subsystems each having different machine-executable code requirements. By using the compilation information received from the first subsystem, the compile module 410 can specifically compile the code needed by the first subsystem.

A transmit module 412 transmits the machine-executable code to the first subsystem. A detect module 414 identifies the source of the machine-executable code being transmitted to the first subsystem. For example, the machine-executable code might include a data stream identifying the source. The data stream might include a digital signature for identification purposes. In a second example, the detect module 414 detects the source based on a secure link. In a third example, the detect module 414 detects the source based on a network ID or address for the second subsystem.

A query operation 416 tests whether the source is a trusted source. The query operation 416 uses a receipt policy to determine whether the source is trusted. If the query operation 416 detects that the source is a trusted source, the operational flow branches "YES" to an accept module 418. The accept module 418 accepts receipt of the machine-executable code on the first subsystem. A use step 420 uses the machine-executable code. For example, the use step 420 can store the machine-executable code in the secondary storage system of the first subsystem. In a second example, the use step 420 can execute the machine-executable code in the first subsystem. The operational flow ends at 422.

It is noted that the detect module 414 and the query operation 416 are not necessary components of the offloading system 400. If the only time that the first subsystem is connected to the second subsystem is through a secure link, the detect module 414 and the query operation 416 are not necessary; security is provided by the secure link.

Referring back to the query operation 416, if the query operation 416 detects the source is not a trusted source, operational flow branches "NO" to a reject module 424. The reject module 424 rejects receipt of the machine-executable code. The operational flow ends at 422.

The operational flow chart depicted in FIG. 4 may best be understood in terms of application examples. In a first application example, referring to FIGS. 1 and 4, the request module 404 receives a request for compilation from the fourth subsystem 204. For example, it is desired to update the operating software of a cellular phone. The transmit operation 406 transmits compilation information associated with the fourth subsystem to the first subsystem 201. The get operation 408 obtains the computer program code desired to be executed on the fourth subsystem 204. In this application example, the get operation 408 finds the computer program code, in the form of IL code, on the second subsystem 202. The computer program code is transferred from the second subsystem 202 to the first subsystem 201. In an alternative example embodiment, the computer program code is contained within the first subsystem 201 for compilation. In yet another example embodiment, the computer program code is transferred from the fourth subsystem 204 to the first subsystem 201.

The compile module 410 uses the second compiler 261 of the first computing subsystem 201 to compile the computer program code into machine-executable code, specifically formatted for the fourth subsystem 204 based on the compilation information received from the fourth subsystem 204. The transmit module 412 transmits the machine-executable code from the first subsystem 201 to the fourth subsystem 204.

The detect module 414 detects that the machine-executable code is being received from the first subsystem 201. The query operation 416 detects that the first subsystem 201 is a trusted source using the fourth receipt policy 244. For example, the fourth receipt policy 244 might indicate that any source connected to the fourth computing subsystem 204 via a dedicated line is a trusted source. In another alternative embodiment, the fourth receipt policy 244 might indicate that a source, which has a coded signature or certificate that matches a predetermined criteria, is a trusted source. In other embodiments, any suitable method for indicating a trusted source might be used. All other sources are not trusted sources. The operational flow branches "YES" to the accept module 418. The accept module 418 accepts receipt of the machine-executable code from the first subsystem 201.

The use module 420 stores the machine-executable code in the secondary storage of the fourth subsystem 204 for later execution by the fourth subsystem 204. The operational flow ends at 422.

In a second application example, the query operation 416 detects that the source of the machine-executable code is not from a trusted source, using the above stated fourth receipt policy 244. For example, the third computing subsystem 203 transmits machine-executable code to the fourth subsystem 204 via a wireless connection. The fourth receipt policy 244 indicates a wireless connection is not a trusted source. The operational flow branches "NO" to the reject module 424. The reject module 424 rejects receipt of the machine-executable code. The operational flow ends at 422.

The logical operations of the various embodiments illustrated herein are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to variously as operations, steps, engines, or modules.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The invention claimed is:

1. A method of offloading compilation in which a first subsystem requests offloaded compilation provided by a second subsystem, wherein the first subsystem is a handheld device, wherein the first subsystem has a secondary storage space having a size, the method comprising:
   transmitting, by the first subsystem, compilation information to the second subsystem,
      wherein the second subsystem is a computing device,
      wherein the compilation information specifies at least:
         a particular machine-executable code format required by the first subsystem,
         the size of the secondary storage space of the first subsystem,
         information identifying computer program code to be translated, and
         instructions instructing the second subsystem to compile a portion of the computer program code into machine-executable code to be stored within the limits of the size of the secondary storage space of the first subsystem,
         wherein the machine-executable code conforms to the particular machine-executed code format;
      wherein the computer program code resides at a third subsystem and is available for transfer to the second subsystem, the third subsystem being a computing system;
   using a receipt policy to determine whether the second subsystem is trusted, wherein the receipt policy indicates that second subsystem is trusted when the first subsystem and the second subsystem are connected via a secure link, wherein the receipt policy is established by an administrator of the first subsystem;
   receiving, at the first subsystem, the machine-executable code from the second subsystem into the first subsystem;
   accepting, by the first subsystem, the machine-executable code when the first subsystem determines that the first subsystem and the second subsystem are connected via the secure link;
   rejecting, by the first computing system, the machine-executable code when the first subsystem determines that the first subsystem and the second subsystem are not connected via the secure link; and
   executing, by the first computing system, the machine-executable code only when the first subsystem accepts the machine-executable code.

2. A method according to claim 1, wherein the step of transmitting compilation information includes transmitting, by the first subsystem, the compilation information from the first subsystem to the second subsystem in response to a request to compile the computer program code into the machine-executable code.

3. A method according to claim 1, wherein the step of transmitting the compilation information includes transmitting, by the first subsystem, the compilation information from a cellular phone to the second subsystem.

4. A method according to claim 1, wherein the first subsystem and the second subsystem are components of a single computing system.

5. A method according to claim 1, wherein the receipt policy requires that the first subsystem and the second subsystem be connected by a dedicated line.

6. A computer program storage medium readable by a first computing system and storing a computer program of instructions for offloading compilation, wherein the first computing system requests offloaded compilation provided by a second computing system, wherein the first computing system is a handheld device, wherein the first computing system has a secondary storage space having a size, wherein the instructions, when executed by the first computing system, cause the first computing system to:
   transmit compilation information from the first computing system to the second computing system,
      wherein computer program code to be translated resides at a third computing system and is available for transfer to the second computing system;
      wherein the compilation information specifies a particular machine-executable code format required by the first computing system,
      wherein the compilation information specifies the size of the secondary storage space of the first computing system,
      wherein the compilation information specifies instructions instructing the second computing system to compile a portion of the computer program code into machine-executable code to be stored within the limits of the size of the secondary storage space of the first computing system, wherein the machine-executable code conforms to the particular machine executable code format;
   use a receipt policy to determine whether the second computing system is trusted, wherein the receipt policy indicates that the second computing system is trusted when the first computing system and the second computing system are connected via a secure link, wherein the receipt policy is established by an administrator of the first computing system;
   receive the machine-executable code from the second computing system into the first computing system;
   accept the machine-executable code when the first computing system determines that the first computing system and the second computing system are connected via the secure link;
   reject the machine-executable code when the first computing system determines that the first computing system and the second computing system are not connected via the secure link; and
   execute the machine-executable code only when the first computing system accepts the machine-executable code.

7. A computer program storage medium according to claim 6, wherein the instructions that cause the first computing system to transmit the compilation information cause the first computing system to transmit the compilation information from the first computing system to the second computing system in response to a request to compile the computer program code into the machine-executable code.

8. A computer program storage medium according to claim 6, wherein the first computing system is a cellular phone.

9. A computer program storage medium according to claim 6, wherein the first computing system and the second computing system are components of a single computing system.

10. A computer program storage medium according to claim 6, wherein the receipt policy requires that the first computing system and the second computing system be connected by a dedicated line.

11. A cellular telephone that requests offloaded compilation provided by a second computing system, the cellular telephone comprising:
   a processing unit; and
   a system memory storing:
      a first receive module comprising instructions that, when executed by the processing unit, cause the cellular telephone to receive a call to execute a program to update operating software of the cellular telephone;
      a transmit module comprising instructions that, when executed by the processing unit, cause the cellular telephone to transmit, in response to the call, compilation information from the cellular telephone to the second computing system,
         wherein the compilation information specifies a particular machine-executable code format required by the cellular telephone,
         wherein the compilation information specifies a size of a memory capacity of the cellular telephone;
         wherein computer program code to be translated resides at a third computing system and is available for transfer to the second computing system,
         wherein the computer program code conforms to an intermediate language,
         wherein the compilation information instructs the second computing system to compile only a portion of the computer program code into machine-executable code to be stored within the limits of the size of the memory capacity of the cellular telephone,
         wherein the machine-executable code conforms to the particular machine executable code format,
      a detect module comprising instructions that, when executed by the processing unit, cause the cellular telephone to use a receipt policy to determine whether the second computing system is trusted, wherein the receipt policy indicates that the second computing system is trusted when the cellular telephone and the second computing system are connected via a secure link, wherein the receipt policy is previously established by an administrator of the cellular telephone; and
      a second receive module comprising instructions that, when executed by the processing unit, cause the cellular telephone to receive the machine-executable code from the second computing system into the cellular telephone;
      an accept module comprising instructions that, when executed by the processing unit, cause the cellular telephone to accept the machine-executable code when the cellular telephone determines that the cellular telephone and the second computing system are connected via the secure link;
      a reject module comprising instructions that, when executed by the processing unit, cause the cellular telephone to reject the machine-executable code when the cellular telephone determines that the cellular telephone and the second computing system are not connected via the secure link;
      instructions that, when executed by the processing unit, cause the cellular telephone to store the machine-executable code only when the cellular telephone accepts the machine-executable code; and
      instructions that, when executed by the processing unit, cause the cellular telephone to execute the machine-executable code only when the cellular telephone accepts the machine-executable code, wherein execution of the machine-executable code causes the cellular telephone to update the operating software of the cellular telephone; and
   a system bus that couples the system memory to the processing unit.

12. A cellular telephone according to claim 11, wherein the cellular telephone and the second computing system are components of a single system.

* * * * *